United States Patent
Sugawara et al.

(10) Patent No.: US 10,008,940 B2
(45) Date of Patent: Jun. 26, 2018

(54) POWER SUPPLY DEVICE AND METHOD FOR CONTROLLING POWER SUPPLY CIRCUIT

(71) Applicant: FUJITSU LIMITED, Kawasaki-shi, Kanagawa (JP)

(72) Inventors: Takahiko Sugawara, Kawasaki (JP); Yu Yonezawa, Sagamihara (JP); Hiroshi Nakao, Yamato (JP); Yoshiyasu Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/295,384

(22) Filed: Oct. 17, 2016

(65) Prior Publication Data

US 2017/0126135 A1    May 4, 2017

(30) Foreign Application Priority Data

Oct. 29, 2015  (JP) ................. 2015-213312

(51) Int. Cl.
*H02M 3/335* (2006.01)
*H02M 1/08* (2006.01)
*H02M 1/36* (2007.01)
*H02M 1/00* (2006.01)

(52) U.S. Cl.
CPC ......... *H02M 3/33507* (2013.01); *H02M 1/08* (2013.01); *H02M 1/36* (2013.01); *H02M 2001/0009* (2013.01)

(58) Field of Classification Search
CPC ........... H02M 1/08; H02M 1/36; H02M 1/42; H02M 1/4241; H02M 3/335; H02M 3/33507; H02M 2001/0009; H02M 2001/0083
See application file for complete search history.

(56) References Cited

U.S. PATENT DOCUMENTS

| | | | |
|---|---|---|---|
| 6,961,253 B1 * | 11/2005 | Cohen ................. | H02M 1/08 363/89 |
| 7,652,898 B2 * | 1/2010 | Kim .................... | H02M 1/36 323/901 |
| 2014/0085941 A1 * | 3/2014 | Li ....................... | H02M 3/33523 363/21.12 |
| 2016/0322904 A1 * | 11/2016 | Tzeng ............... | H02M 3/33507 |

FOREIGN PATENT DOCUMENTS

| | | |
|---|---|---|
| EP | 2 424 099 A1 | 2/2012 |
| JP | 2010-259153 | 11/2010 |
| JP | 2013-46489 | 3/2013 |

* cited by examiner

*Primary Examiner* — Matthew Nguyen
(74) *Attorney, Agent, or Firm* — Staas & Halsey LLP

(57) ABSTRACT

A power supply device includes: a memory; and a processor coupled to the memory and the processor configured to: determine a duty ratio of a control signal of a switching element in a power supply circuit so that an output voltage of the power supply circuit approaches a target voltage; compute an acceptable range of a duty ratio based on an output current of the power supply circuit detected by a current detecting circuit; output the duty ratio when the duty ratio is inside the acceptable range; and stop the power supply circuit when the duty ratio is outside the acceptable range.

9 Claims, 7 Drawing Sheets

POWER SUPPLY DEVICE AND METHOD FOR CONTROLLING POWER SUPPLY CIRCUIT

CROSS-REFERENCE TO RELATED APPLICATION

This application is based upon and claims the benefit of priority of the prior Japanese Patent Application No. 2015-213312, filed on Oct. 29, 2015, the entire contents of which are incorporated herein by reference.

FIELD

The embodiments discussed herein are related to a power supply device and a method for controlling a power supply circuit.

BACKGROUND

A switching power supply device having a power supply circuit and a computing unit is well known. The power supply circuit includes a switching unit provided on the input side. The computing unit derives an output current of the power supply circuit based on a direct current component of the input current of the power supply circuit and a duty ratio of the switching unit.

Moreover, a power supply device having a rectifying circuit, an active filter, a smoothing circuit, and an inverter is well known. The rectifying circuit rectifies a first alternating current voltage. The active filter is provided in the stage subsequent to the rectifying circuit. The smoothing circuit smooths the output voltage of the active filter and generates a direct current voltage. The inverter converts the direct current voltage to a second alternating current voltage. The active filter includes a reactor for receiving the output voltage of the rectifying circuit at one terminal of the reactor, a diode having an anode connected to the other terminal of the reactor and a cathode connected to the smoothing circuit, and a switching element connected between the other terminal of the reactor and a reference voltage line. A microcomputer detects the input current, the input voltage, and the output voltage of the active filter, and controls the ON/OFF of the switching element so that the phases of the input current and the input voltage match and so that the output voltage of the active filter matches a reference voltage based on the detection results. The microcomputer includes a target duty ratio calculating unit, a duty ratio calculating unit, and a signal generating unit. The target duty ratio calculating unit calculates the target duty ratio based on an input voltage, an input current, an output voltage, and a target voltage. The duty ratio calculating unit calculates the duty ratio of the present cycle so that the difference between the target duty ratio calculated by the target duty ratio calculating unit and the duty ratio of the previous cycle gradually becomes smaller. When the input current exceeds a predetermined first threshold value current, or when the output voltage exceeds a predetermined first threshold value voltage, the duty ratio calculating unit instantaneously reduces the duty ratio of the present cycle below the duty ratio of the previous cycle. The signal generating unit generates a control signal for the switching element based on the duty ratio of the present cycle calculated by the duty ratio calculating unit.

When an overcurrent suddenly flows through the power supply circuit, the power supply circuit may be protected by stopping the power supply circuit. However, when a current detecting circuit for detecting the current of the power supply circuit is damaged, the current detecting circuit does not detect the proper current and the power supply circuit is not protected.

The followings are reference documents.
[Document 1] Japanese Laid-open Patent Publication No. 2013-46489 and
[Document 2] Japanese Laid-open Patent Publication No 2010-259153.

SUMMARY

According to an aspect of the invention, a power supply device includes: a memory; and a processor coupled to the memory and the processor configured to: determine a duty ratio of a control signal of a switching element in a power supply circuit so that an output voltage of the power supply circuit approaches a target voltage; compute an acceptable range of a duty ratio based on an output current of the power supply circuit detected by a current detecting circuit; output the duty ratio when the duty ratio is inside the acceptable range; and stop the power supply circuit when the duty ratio is outside the acceptable range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

Figure 1:
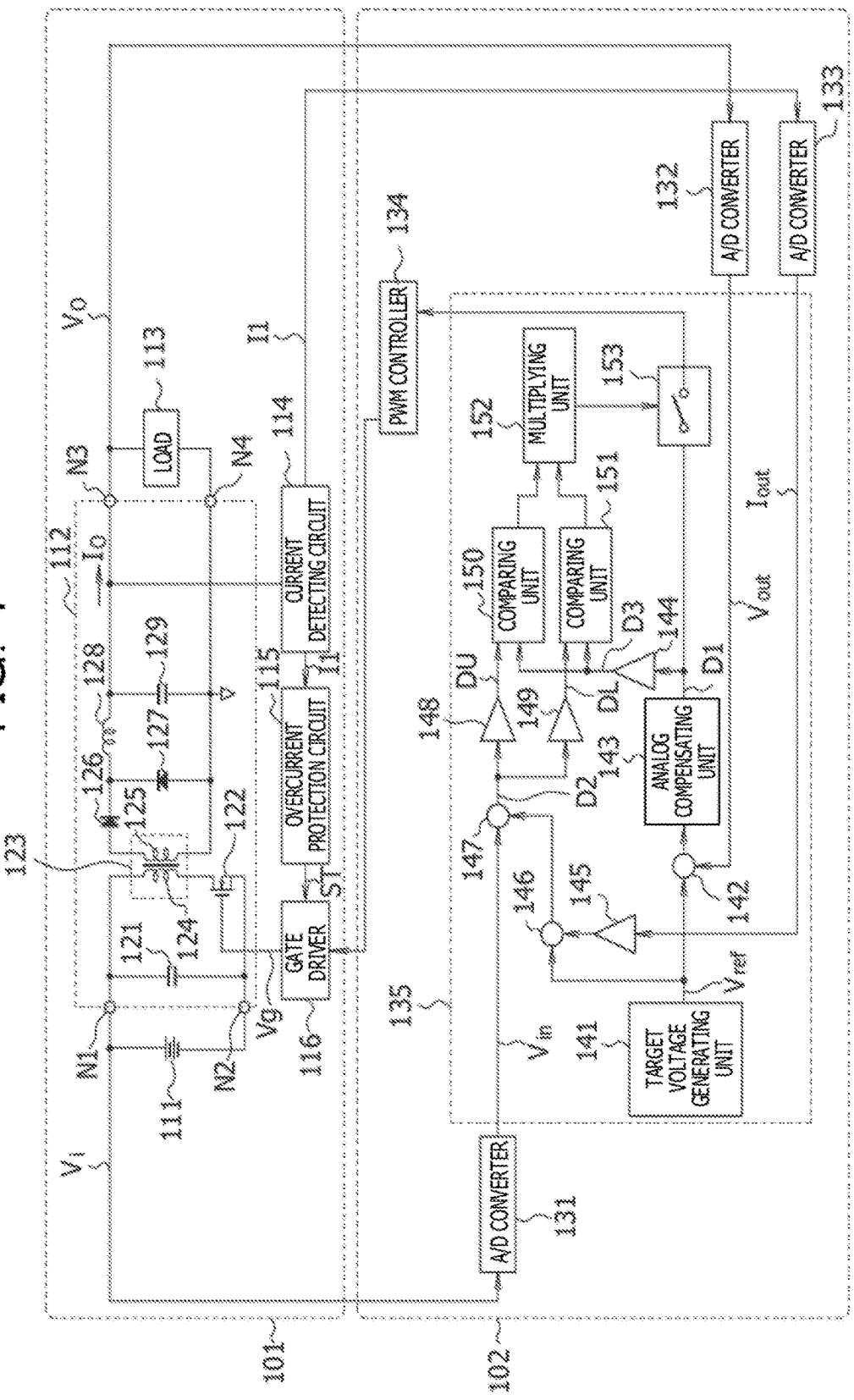
FIG. 1 is an example of a configuration of a power supply device according to a first embodiment.

FIG. 1 is an example of a configuration of a power supply device according to a first embodiment. The power supply device is a power supply device in a server device, for example, and has a power supply circuit 101 and a control device 102. The power supply circuit 101 has a direct current power source 111, a switching circuit 112, a load 113, a current detecting circuit 114, an overcurrent protection circuit 115, and a gate driver 116. The switching circuit 112 has an electrolytic condenser 121, an n-channel field effect transistor 122, a transformer 123, diodes 126 and 127, an inductor 128, an electrolytic condenser 129, input nodes N1 and N2, and output nodes N3 and N4. The transformer 123 has a primary winding 124 and a secondary winding 125. The field effect transistor 122 is preferably a gallium nitride (GaN) high electron mobility transistor (HEMT), but may also be a MOS field effect transistor. The HEMT transistor has the advantages of a high voltage resistance and high-speed switching. The switching circuit 112 receives a direct current input voltage Vi of, for example, 12 V, from the direct current power source 111, reduces the voltage of the direct current voltage Vi, and outputs a direct current output voltage Vo of, for example, 5 V, to the load 113. The load 113 is a processor or an electronic device and the like. When the input voltage Vi is 12 V and the output voltage Vo is 5 V, the turn ratio between the primary winding 124 and the secondary winding 125 is 12:5.

The direct current power source 111 supplies the direct current voltage Vi of, for example, 12 V, between in input nodes N1 and N2. The electrolytic condenser 121 is connected at a location between the input nodes N1 and N2, is charged by the input voltage Vi, and outputs a charged voltage. The primary winding 124 of the transformer 123 is connected at a location between the input node N1 and a drain of the field effect transistor 122. The field effect transistor 122 is a switching element. The gate of the field effect transistor 122 is connected to the gate driver 116, and the source of the field effect transistor 122 is connected to the input node N2. The secondary winding 125 is connected at a location between an anode of the diode 126 and the output node N4. The output node N4 is ground potential node. The diode 127 has an anode that is connected to the output node N4 and a cathode that is connected to a cathode of the diode 126. The inductor 128 is connected at a location between the cathode of the diode 126 and the output node N3. The electrolytic condenser 129 is connected at a location between the output nodes N3 and N4.

The transformer 123 transforms the voltage of the primary winding 124 and outputs the transformed voltage to the secondary winding 125. Specifically, when a voltage is applied to the primary winding 124, a voltage lower than the voltage of the primary winding 124 is generated in the secondary winding 125. The diodes 126 and 127 are rectifying circuits and rectify the voltage of the secondary winding 125. The inductor 128 and the electrolytic condenser 129 represent a smoothing circuit, and smooth the voltage of the rectifying circuit and output the smoothed voltage to a location between the output nodes N3 and N4. The output voltage Vo between the output nodes N3 and N4 is a direct current voltage of 5 V, for example, and is supplied to the load 113 as a power supply voltage.

A control signal Vg of a high-frequency pulse is inputted to the gate of the field effect transistor 122. The control signal Vg is a gate voltage. The gate driver 116 controls the pulse width of the control signal Vg of the field effect transistor 122 in response to the output signal of a pulse width modulation (PWM) controller 134. As discussed below, the gate driver 116 increases the pulse width of the control signal Vg of the field effect transistor 122 if the output voltage Vo is lower than a target voltage (for example, 5 V) Vref, and reduces the pulse width of the control signal Vg of the field effect transistor 122 if the output voltage Vo is higher than the target voltage (for example, 5 V) Vref. As a result, even if the output voltage Vo changes due to fluctuations of the load 113, the output voltage Vo between the output nodes N3 and N4 may be controlled so as to approach the target voltage (for example, 5 V) Vref.

The current detecting circuit 114 detects an output current Io of the switching circuit 112 inside the power supply circuit 101 and outputs the detected current as a current I1. The output current Io is the current flowing through the output node N3. The overcurrent protection circuit 115 determines that an overcurrent is flowing through the switching circuit 112 when the detected current I1 is greater than a threshold, and outputs a stop signal ST to the gate driver 116 to protect the switching circuit 112. The gate driver 116 locks the control signal Vg to a low level when the stop signal ST is received. As a result, the field effect transistor 122 maintains an OFF state and the output voltage Vo is locked to 0 V.

If the current detecting circuit 114 is damaged at this time, the output current Io is not detected accurately and the current I1 smaller than the output current Io may be outputted. In this case, even if the output current Io is an overcurrent, the detected current I1 is lower than the threshold and the overcurrent protection circuit 115 is unable to output the stop signal ST. As a result, there is a problem that this condition may lead to the failure of the switching circuit 112. The following discusses how the control device 102 is able to stop the power supply circuit 101 when an overcurrent flows through the switching circuit 112 even if the current detecting circuit 114 has failed.

Figure 2:
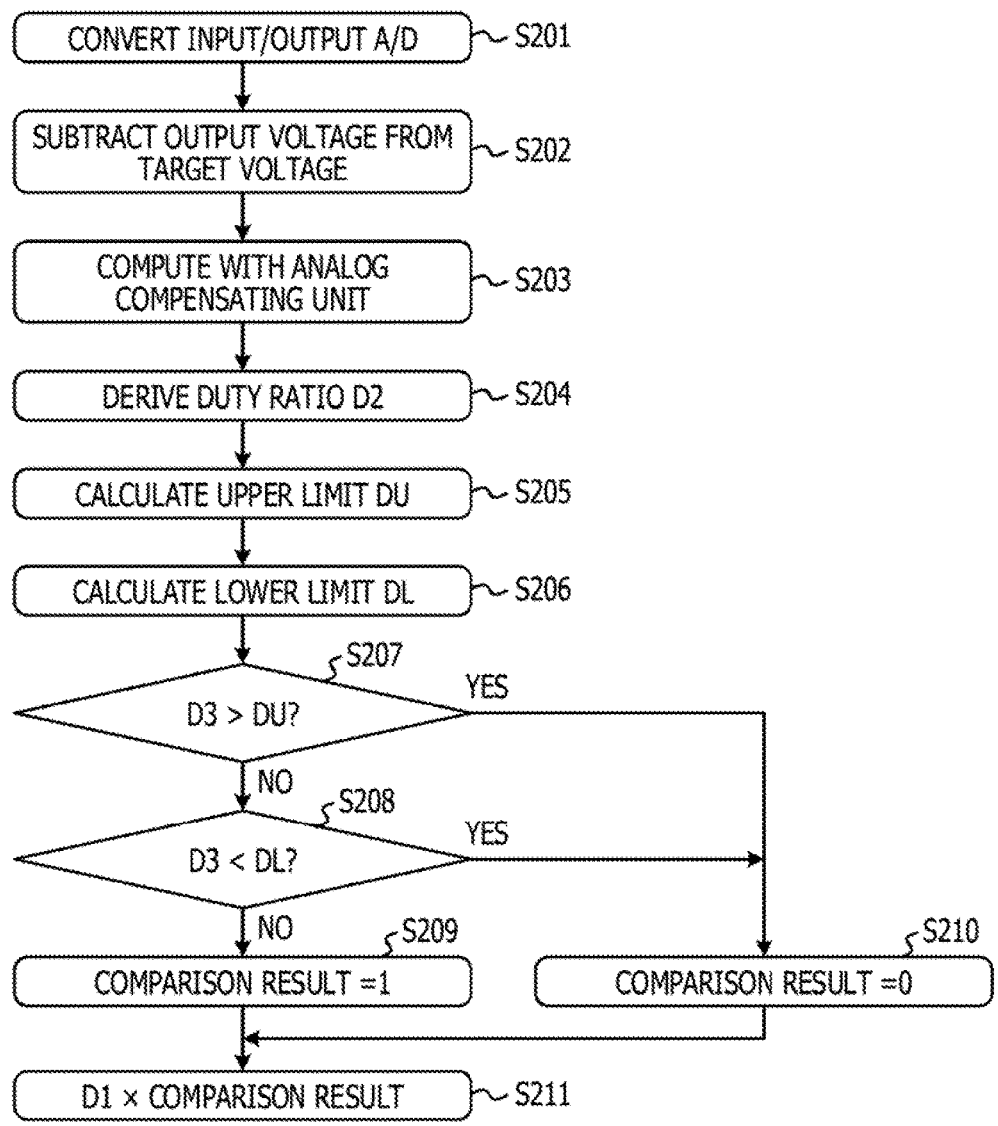
FIG. 2 is a flow chart depicting a control method of a power supply circuit carried out by a control device.

FIG. 2 is a flow chart depicting a control method of the power supply circuit 101 carried out by the control device 102. The control device 102 is a microcomputer, for example, and has analog/digital (A/D) converters 131-133, the PWM controller 134, and a central processing unit (CPU) 135. In step S201, the A/D converter 131 converts the analog input voltage Vi of the power supply circuit 101 to a digital input voltage Vin. The A/D converter 132 converts the analog output voltage Vo of the power supply circuit 101 to a digital output voltage Vout. The A/D converter 133 converts the analog output current I1 detected by the current detecting circuit 114 to a digital output current Iout.

The CPU 135 realizes the functions of the processing block illustrated in FIG. 1 by executing a program stored in a memory. The processing block of the CPU 135 has a target voltage generating unit 141, a subtracting unit 142, an analog compensating unit 143, a low-pass filter unit 144, a first multiplying unit 145, an adding unit 146, a dividing unit 147, a second multiplying unit 148, a third multiplying unit 149, a first comparing unit 150, a second comparing unit 151, a fourth multiplying unit 152, and a switch unit 153. The processing block of the CPU 135 may be configured with hardware.

The target voltage generating unit 141 stores the target voltage Vref and outputs the target voltage Vref. The target voltage Vref is, for example, 5 V. In step S202, the subtracting unit 142 subtracts the output voltage Vout from the target voltage Vref and outputs the subtraction result to the analog compensating unit 143. In step S203, the analog compensating unit 143 determines a duty ratio D1 in accordance with the subtraction result from the subtracting unit 142. The duty ratio D1 is a duty ratio of the control signal Vg and is expressed as Vo/Vin. The analog compensating unit 143 determines the duty ratio D1 so that the output voltage Vout approaches the target voltage Vref. For example, the analog compensating unit 143 outputs the duty ratio D1 of Vout/Vin=5 V/12 V when the output voltage Vout is the same as the target voltage Vref. Further, the analog compensating unit 143 outputs the duty ratio D1 larger than 5 V/12 V when the output voltage Vout is the less than the target voltage Vref. When the duty ratio D1 of the control signal Vg becomes larger, the pulse width of the control signal Vg increases and the output voltage Vo rises. Further, the analog compensating unit 143 outputs the duty ratio D1 less than 5 V/12 V when the output voltage Vout is the higher than the target voltage Vref. When the duty ratio D1 of the control signal Vg becomes smaller, the pulse width of the control signal Vg decreases and the output voltage Vo falls. As a result of this feedback control, the output voltage Vo may be maintained at a fixed value with respect to the target voltage Vref. As described above, the subtracting unit 142 and the analog compensating unit 143 represent a duty ratio determining unit, and determine the duty ratio D1 of the control signal Vg of the field effect transistor 122 in the power supply circuit 101 so that the output voltage Vout approaches the target voltage Vref.

The first multiplying unit 145 multiplies a wiring resistance R1 of the switching circuit 112 in the power supply circuit 101 by the output current Iout and outputs a dropped voltage Iout×R1 of the switching circuit 112 to the adding unit 146. The wiring resistance R1 is the resistance of the wiring through which the output current Io flows in the switching circuit 112. The adding unit 146 adds the dropped voltage Iout×R1 outputted by the first multiplying unit 145 and the target voltage Vref and outputs a voltage Vref+(Iout×R1) to the dividing unit 147. In step S204, the dividing unit 147 divides the voltage Vref+(Iout×R1) outputted by the adding unit 146 by the input voltage Vin and outputs {Vref+(Iout×R1)}/Vin as a duty ratio D2. The voltage Vref+(Iout×R1) corresponds to the output voltage Vout in this case and therefore the duty ratio D2 would be the same as the duty ratio D1 if the current detecting circuit 114 has not failed. The duty ratio D1 is a duty ratio based on the output voltage Vout. The duty ratio D2 is a duty ratio based on the output current Iout.

The A/D converter 131 may be omitted. In this case, the input voltage Vin locked by an input voltage generating unit is stored and the locked input voltage Vin may be outputted to the dividing unit 147 in the same way as the target voltage generating unit 141. The input voltage Vin is 12 V for example.

In step S205, the second multiplying unit 148 multiplies the duty ratio D2 outputted by the dividing unit 147 by a first coefficient K1 and outputs D2×K1 as an upper limit DU in an acceptable range. The first coefficient K1 is 1.1 for example. In step S206, the third multiplying unit 149 multiplies the duty ratio D2 outputted by the dividing unit 147 by a second coefficient K2 and outputs D2×K2 as a lower limit DL of the acceptable range. The second coefficient K2 is 0.97, for example, and is smaller than the first coefficient K1. The low-pass filter unit 144 performs low-pass filtering on the duty ratio D1 outputted by the analog compensating unit 143, and outputs a duty ratio D3 having an attenuated high-frequency component.

As described above, the first multiplying unit 145, the adding unit 146, the dividing unit 147, the second multiplying unit 148, and the third multiplying unit 149 represent an acceptable range computing unit, and compute the upper limit DU and the lower limit DL of the acceptable range of the duty ratios based on the output current Iout detected by the current detecting circuit 114.

In step S207, the first comparing unit 150 outputs a value of zero if the duty ratio D3 outputted by the low-pass filter unit 144 is greater than the upper limit DU of the acceptable range, and the routine advances to step S210. Moreover, the first comparing unit 150 outputs a value of 1 if the duty ratio D3 outputted by the low-pass filter unit 144 is equal to or less than the upper limit DU of the acceptable range, and the routine advances to step S208.

In step S208, the second comparing unit 151 outputs a value of 0 if the duty ratio D3 outputted by the low-pass filter unit 144 is less than the lower limit DL of the acceptable range, and the routine advances to step S210. Moreover, the second comparing unit 151 outputs a value of 1 if the duty ratio D3 outputted by the low-pass filter unit 144 is equal to or greater than the lower limit DL of the acceptable range, and the routine advances to step S209.

In step S209, the fourth multiplying unit 152 multiplies the output value "1" of the first comparing unit 150 by the output value "1" of the second comparing unit 151 and outputs the comparative result of "1" to the switch unit 153. Thereafter, the control device 102 proceeds to the processing in step S211.

In step S210, the fourth multiplying unit 152 multiplies the output value of the first comparing unit 150 by the output value of the second comparing unit 151 and outputs the comparative result of "0" to the switch unit 153. Thereafter, the control device 102 proceeds to the processing in step S211.

In step S211, the switch unit 153 outputs the duty ratio D1 outputted by the analog compensating unit 143 to the PWM controller 134 if the comparison result outputted by the fourth multiplying unit 152 is "1". In this case, the PWM controller 134 outputs a pulse signal having the pulse width of the duty ratio D1 to the gate driver 116. The gate driver 116 adjusts the level of the pulse signal received from the PWM controller 134 and outputs the control signal Vg to the gate of the field effect transistor 122. The duty ratio of the control signal Vg is the duty ratio D1. The field effect transistor 122 carries out ON/OFF operations in response to the control signal Vg and the output voltage Vo is controlled to match the voltage in accordance with the duty ratio D1.

Moreover, the switch unit 153 outputs the duty ratio D1 outputted by the analog compensating unit 143 to the PWM controller 134 if the comparison result outputted by the fourth multiplying unit 152 is "0". In this case, the PWM controller 134 outputs a low-level fixed signal in which the duty ratio is 0 to the gate driver 116. Consequently, the gate driver 116 outputs the control signal Vg fixed to the low level having the duty ratio of 0 to the gate of the field effect transistor 122. As a result, the field effect transistor 122 maintains an OFF state and the output voltage Vo is maintained at 0 V.

As described above, the first comparing unit 150, the second comparing unit 151, the fourth multiplying unit 152, and the switch unit 153 represent an output unit, and output the duty ratio D1 when the duty ratio D3 is inside the acceptable range of the upper limit DU and the lower limit DL, and stops the power supply circuit 101 when the duty ratio D3 is outside the acceptable range of the upper limit DU and the lower limit DL.

Figure 3:
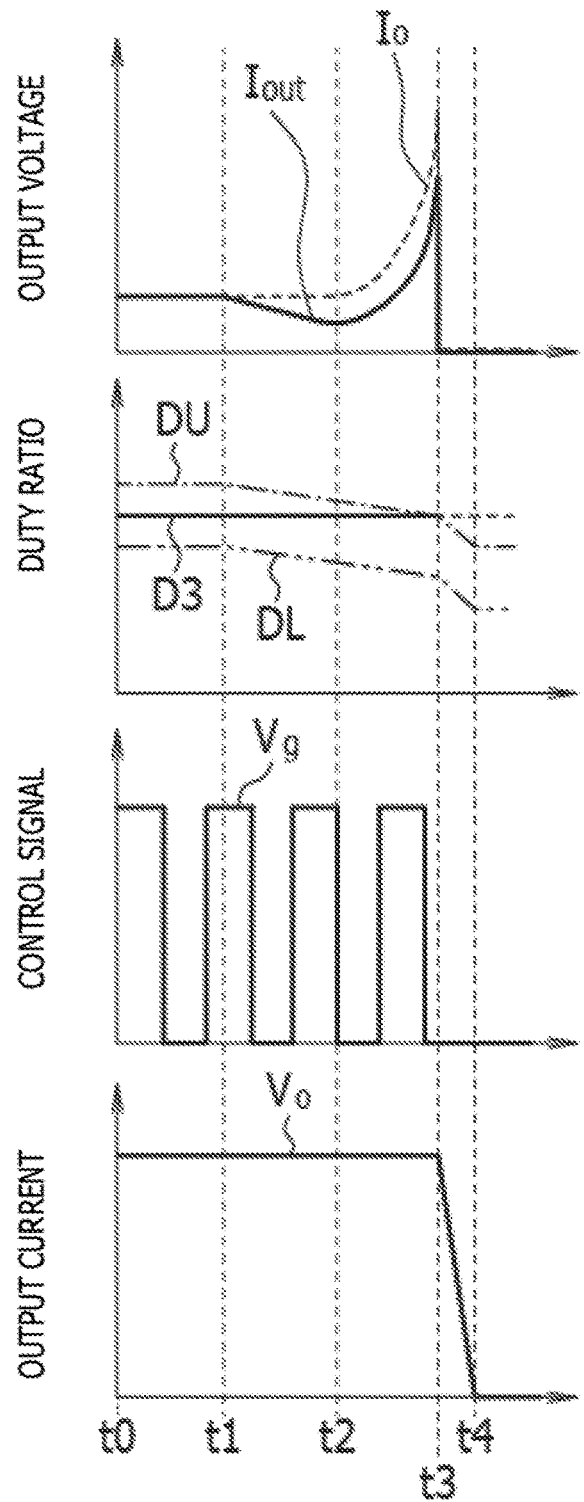
FIG. 3 is a timing chart depicting operation examples of the power supply device illustrated in FIG. 1.

FIG. 3 is a timing chart depicting operation examples of the power supply device illustrated in FIG. 1. The following explanation discusses an example in which the current detecting circuit 114 fails at a time t1 and the gain is reduced. Between the times t0 to t1, the current detecting circuit 114 is in a normal state and the output current Iout that is the same as the output current Io flowing through the output node N3 is detected. Conversely, after the time t1, the current detecting circuit 114 is in a failed state, and the output current Iout that is less than the output current Io flowing through the output node N3 is detected.

Between the times t0 to t3, the output voltage Vo is fixed and therefore the duty ratio D3 is fixed and the pulse width of the control signal Vg is also fixed. The actual output current Io is fixed between the times t0 to t2. The detected output current Iout is fixed between the times t0 to t1, and therefore the upper limit DU and the lower limit DL of the acceptable range are also fixed. Conversely, after the time t1, the detected output current Iout falls and falls below the upper limit DU and the lower limit DL of the acceptable range. At the time t2, an abnormality of the load 113 occurs and the actual output current Io begins to rise. At the time t3, the duty ratio D3 exceeds the upper limit DU of the acceptable range, the switch unit 153 is turned OFF, and the control signal Vg is maintained at the low level. From the time t4 onward, the output voltage Vo is maintained at 0 V. When the actual output current Io becomes an overcurrent at the time t3, the control signal Vg is maintained at the low level and the power supply circuit 110 may be stopped. Even if the current detecting circuit 114 fails, the power supply circuit 101 is stopped and the power supply circuit 101 may be protected if the actual output current Iout becomes an overcurrent.

Figure 4:
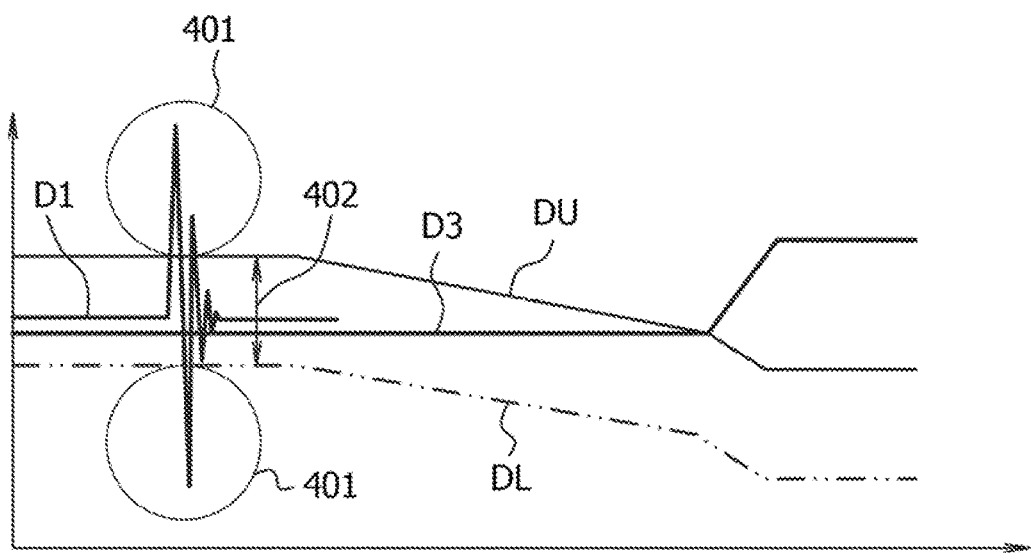
FIG. 4 is a view for explaining the effects of a low-pass filter unit in FIG. 1.

FIG. 4 is a view for explaining the effects of the low-pass filter unit 144 in FIG. 1. The low-pass filter unit 144 performs low-pass filtering on the duty ratio D1 outputted by the analog compensating unit 143, and outputs the duty ratio D3 having an attenuated high-frequency component. An acceptable range 402 is the range between the upper limit DU and the lower limit DL. The duty ratio D1 changes in response to fluctuations of the load 113 and instantaneously moves outside the acceptable range 402 in the area 401. However, this condition is due to fluctuations of the normal load 113 and is not caused by a failure of the current detecting circuit 114. Hypothetically, if there was no low-pass filter unit 144, the switch unit 153 would enter the OFF state when the duty ratio D1 moved outside the acceptable range 402 and the power supply circuit 101 would stop which could lead to an operational error. Accordingly, the low-pass filter unit 144 is provided in order to suppress operational errors due to the normal fluctuations of the load 113. The instantaneous fluctuation components of the duty ratio D3, which are high-frequency components, are attenuated in accordance with the duty ratio D1. As a result, even if the duty ratio D1 instantaneously fluctuates due to the fluctuations of the normal load 113, the duty ratio D3 stays within the acceptable range 402 and the power supply circuit 101 is not stopped and operational errors may be suppressed. If the changes of the duty ratio D1 due to the fluctuations of the normal load 113 are small, the low-pass filter unit 144 may be omitted.

Figure 5:
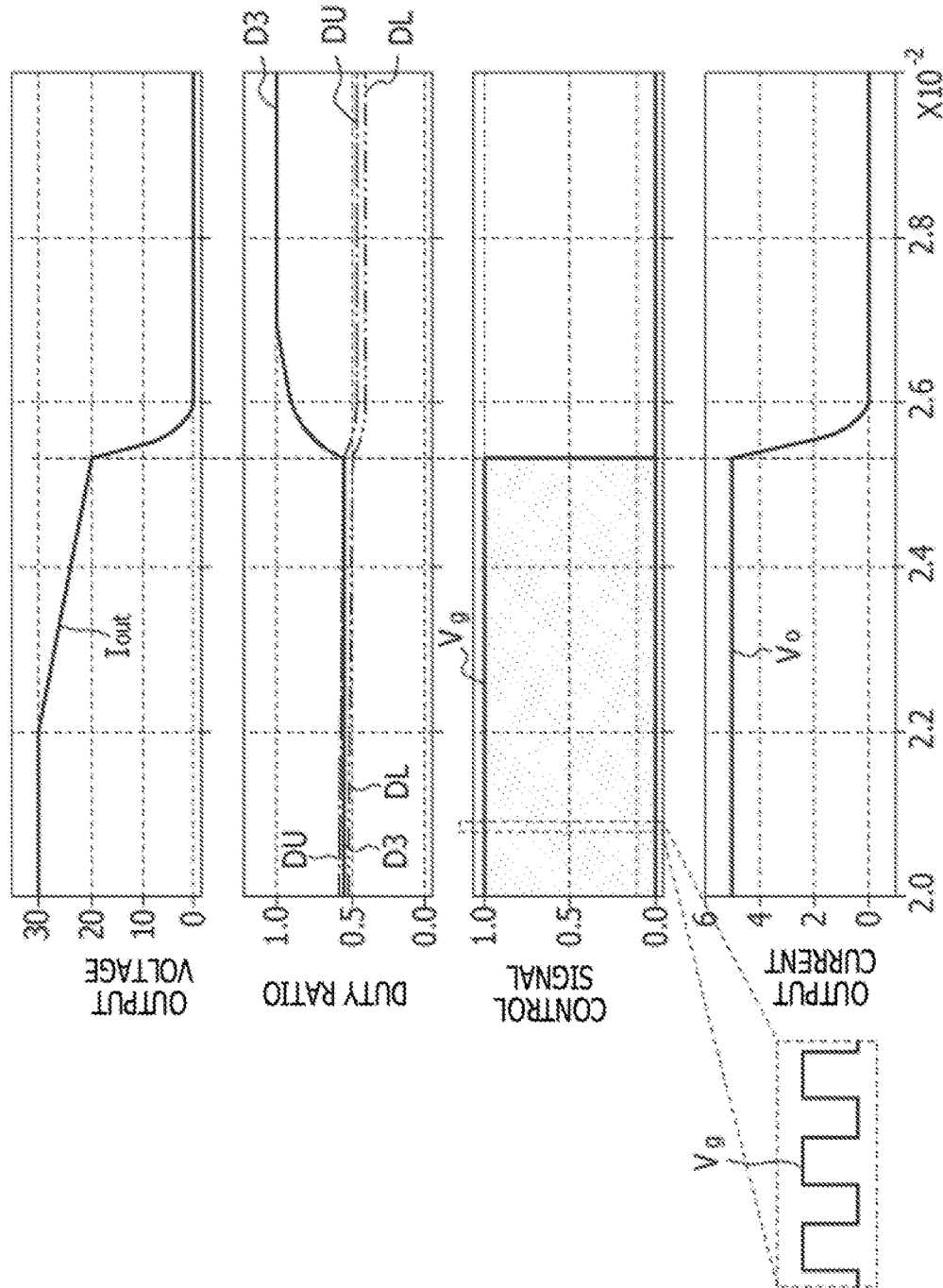
FIG. 5 is a simulation result of the power supply device in FIG. 1.

FIG. 5 is a simulation result of the power supply device in FIG. 1. From $2.0 \times 10^{-2}$ to $2.2 \times 10^{-2}$ (s), the current detecting circuit 114 is operating normally. From $2.2 \times 10^{-2}$ (s), the current detecting circuit 114 operates abnormally due to a failure and the output current Iout falls. Between $2.0 \times 10^{-2}$ to $2.52 \times 10^{-2}$ (s), the output voltage Vo is fixed and therefore the duty ratio D3 is fixed, the pulse width of the control signal Vg is fixed as illustrated in the enlargement in FIG. 5, and the duty ratio D3 is within the acceptable range between the upper limit DU and the lower limit DL. The upper limit DU and the lower limit DL gradually fall. At $2.52 \times 10^{-2}$ (s), the duty ratio D3 exceeds the upper limit DU and the control signal Vg is maintained at 0 V. As a result, the output voltage Vo falls toward 0 V and the power supply circuit 101 stops. According to the simulation, when the current detecting circuit 114 fails and the gain drops, the failure is detected and the power supply device may confirm the stoppage of the power supply circuit 101.

Figure 6:
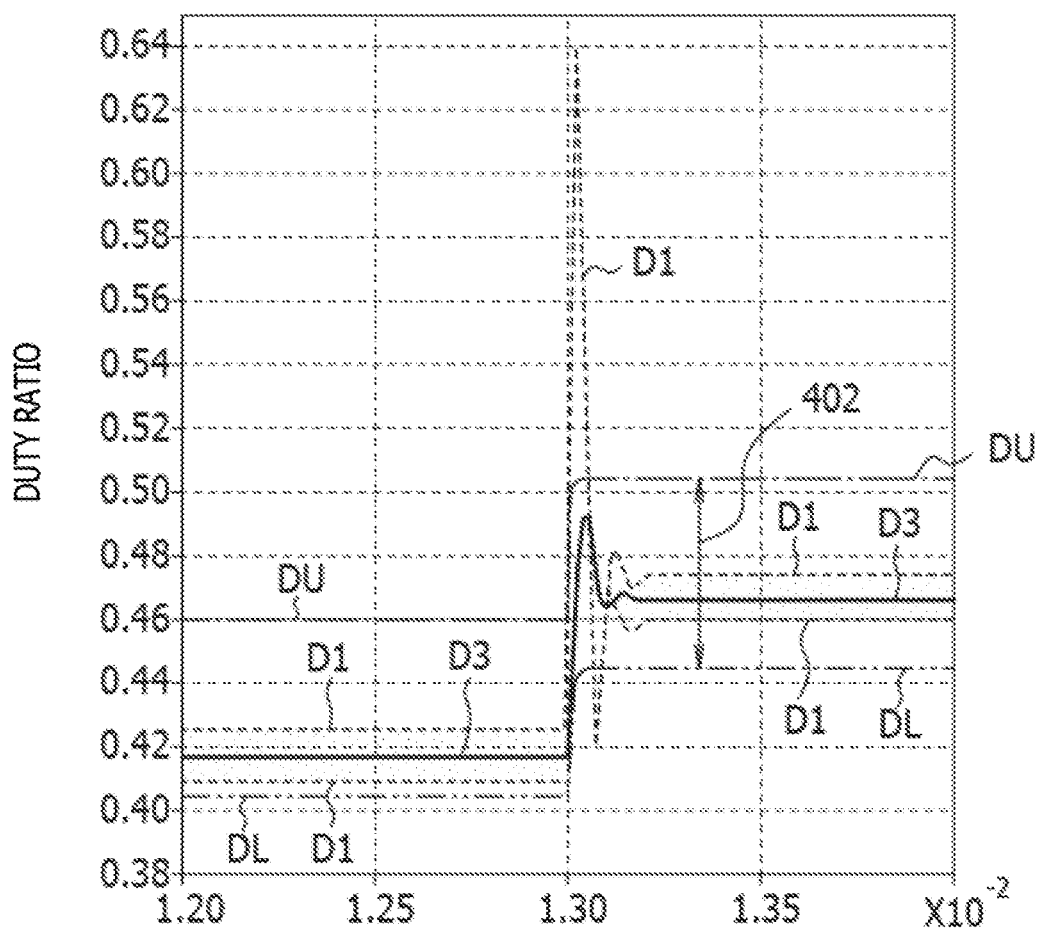
FIG. 6 is a simulation result of the low-pass filter unit illustrated in FIG. 1.

FIG. 6 is a simulation result of the low-pass filter unit 144 in FIG. 1. The low-pass filter unit 144 inputs the duty ratio D1 and outputs the duty ratio D3. The acceptable range 402 is the range between the upper limit DU and the lower limit DL. At $1.30 \times 10^{-2}$ (s), the duty ratios D1 and D3 and the upper limit DU and the lower limit DL change due to the fluctuations of the normal load 113. The change of the duty ratio D3 is smaller than the change of the duty ratio D1. While the duty ratio D1 moves outside the acceptable range 402, the duty ratio D3 stays within the acceptable range 402 and therefore the ability to suppress an operational error due to the fluctuation of the normal load 113 may be confirmed. The time constant of the low-pass filter unit 144 in this example is 60 μs. The time constant of the low-pass filter unit 144 may be a time constant shorter than the change time of the fluctuations of the normal load 113.

Second Embodiment

Figure 7:
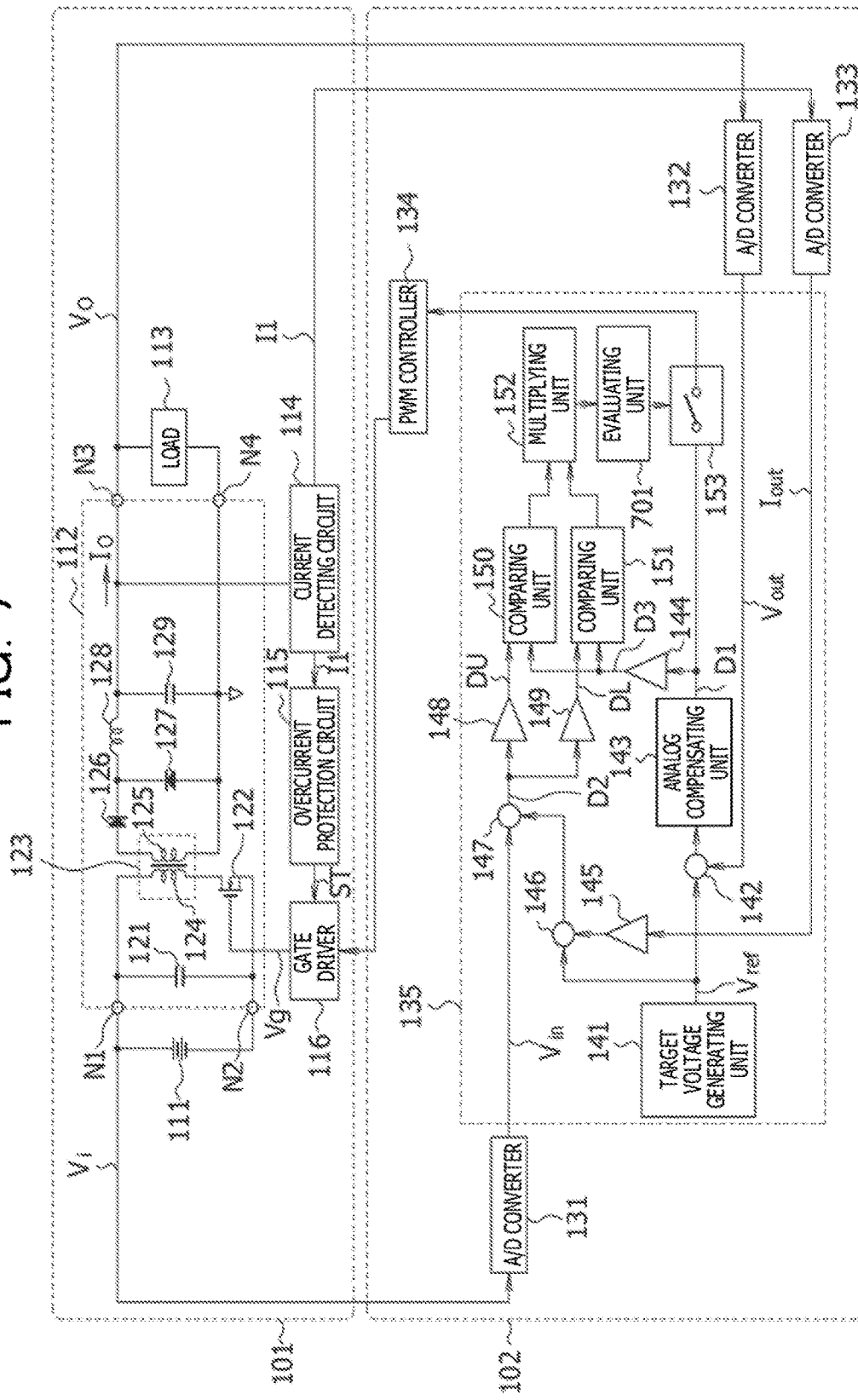
FIG. 7 is an example of a configuration of a power supply device according to a second embodiment.

FIG. 7 is an example of a configuration of a power supply device according to a second embodiment. The power supply device in FIG. 7 is provided with an evaluating unit 701 in place of the low-pass filter unit 144 in comparison to the power supply device illustrated in FIG. 1. The following is an explanation of the differences between the present embodiment and the first embodiment. The first comparing unit 150 outputs the value 0 when the duty ratio D1 outputted by the analog compensating unit 143 is greater than the upper limit DU of the acceptable range, and outputs the value 1 when the duty ratio D1 outputted by the analog compensating unit 143 is equal to or less than the upper limit DU of the acceptable range. The second comparing unit 151 outputs the value 0 when the duty ratio D1 outputted by the analog compensating unit 143 is less than the lower limit DL of the acceptable range, and outputs the value 1 when the duty ratio D1 outputted by the analog compensating unit 143 is equal to or greater than the lower limit DL of the acceptable range. The fourth multiplying unit 152 outputs the value 1 when the duty ratio D1 is within the acceptable range of the upper limit DU and the lower limit DL, and outputs the value 0 when the duty ratio D1 is outside the acceptable range of the upper limit DU and the lower limit DL.

The evaluating unit 701 refers to the values outputted by the fourth multiplying unit 152 and outputs the value 1 when the duration time while the duty ratio D1 is outside the acceptable range of the upper limit DU and the lower limit DL is shorter than a threshold, and outputs the value 0 when the duration time while the duty ratio D1 is outside the acceptable range of the upper limit DU and the lower limit DL is longer than the threshold. The evaluating unit 701 outputs the value 1 when the duty ratio D1 is within the acceptable range of the upper limit DU and the lower limit DL. The switch unit 153 outputs the duty ratio D1 to the PWM controller 134 when the value 1 is outputted by the evaluating unit 701, and turns to the OFF state and outputs the duty ratio D1 when the value 0 is outputted by the evaluating unit 701.

The abovementioned threshold is preferably twice the transient response time of the power supply circuit 101. The transient response time of the power supply circuit 101 is generally published in the specification of the power supply circuit 101 and is, for example, 50 μs. In this case, the threshold is preferably 100 μs. If the above threshold were about the same as the transient response time of the power supply circuit 101, there would be a concern for operational errors. Moreover, if the above threshold were much larger than the transient response time of the power supply circuit 101, there would be a concern that damage to the power supply circuit 101 due to an overcurrent could not be avoided.

As described above, the first comparing unit 150, the second comparing unit 151, the fourth multiplying unit 152, and the evaluating unit 701, and the switch unit 153 represent an output unit, and the output unit outputs the duty ratio D1 when the duration time of the duty ratio D1 outside the acceptable range of the upper limit DU and the lower limit DL is shorter than the threshold, and stops the power supply circuit 101 when the duration time of the duty ratio D1 outside the acceptable range of the upper limit DU and the lower limit DL is greater than the threshold.

According to the present embodiment, the evaluating unit 701 outputs the value 1 when the duration time of the duty ratio D1 outside the acceptable range of the upper limit DU and the lower limit DL is shorter than the threshold, and therefore same function as the function of the low-pass filter unit 144 in FIG. 1 may be realized. The power supply device of the present embodiment is able to stop the power supply circuit 101 and suppress operational errors in the same way as the first embodiment because the switch unit 153 outputs the duty ratio D1 when the duty ratio D1 fluctuates instantaneously due to the fluctuation of the normal load 113.

As described above, according to the first and second embodiments, the power supply circuit may be stopped when an overcurrent flows through the power supply circuit 101 even when the current detecting circuit 114 has failed.

The computer of the CPU 135 may be realized by executing a program in the first and second embodiments. Moreover, a computer-readable recording medium having the above program recorded thereon and a computer program product of the above program may be used as the embodiments discussed herein. A flexible disk, a hard disk, an optical disk, a magneto-optic disc, a CD-ROM, an electromagnetic tape, a non-volatile memory card, or a ROM and the like may be used as the recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power supply device comprising:
    a memory; and
    a processor coupled to the memory and the processor configured to:
        determine a duty ratio of a control signal of a switching element in a power supply circuit so that an output voltage of the power supply circuit approaches a target voltage;
        compute an acceptable range of a duty ratio based on an output current of the power supply circuit detected by a current detecting circuit;
        output the duty ratio when the duty ratio is inside the acceptable range;
        stop the power supply circuit when the duty ratio is outside the acceptable range;
        multiply a wiring resistance of the power supply circuit by the output current of the power supply circuit detected by the current detecting circuit;
        add an output value of the multiplying to the target voltage; and
        divide an output value of the adding by an input voltage of the power supply circuit.

2. The power supply device according to claim 1, wherein the processor is configured to compute the acceptable range of the duty ratio based on the output current of the power supply circuit detected by the current detecting circuit and an input voltage of the power supply circuit.

3. The power supply device according to claim 1, wherein the processor is configured to compute the acceptable range of the duty ratio based on the output current of the power supply circuit detected by the current detecting circuit, an input voltage of the power supply circuit, and the target voltage.

4. The power supply device according to claim 1, wherein the processor is configured to compute the acceptable range of the duty ratio based on the output current of the power supply circuit detected by the current detecting circuit, an input voltage of the power supply circuit, the target voltage, and a wiring resistance of the power supply circuit.

5. The power supply device according to claim 1, wherein the processor is configured to
    output an upper limit of the acceptable range by multiplying the output value of the dividing by a first coefficient; and
    output a lower limit of the acceptable range by multiplying the output value of the dividing by a second coefficient.

6. The power supply device according to claim 1, wherein the processor is configured to
    perform low-pass filtering on the duty ratio determined by the duty ratio determining,
    output the duty ratio determined by the duty ratio determining when the duty ratio is inside the acceptable range, and
    stop the power supply circuit when the duty ratio is outside the acceptable range.

7. The power supply device according to claim 1, wherein the processor is configured to
    output the duty ratio determined by the duty ratio determining when a duration time while the duty ratio determined by the duty ratio determining is outside the acceptable range is shorter than a threshold, and
    stop the power supply circuit when the duration time while the duty ratio determined by the duty ratio determining is outside the acceptable range is greater than the threshold.

8. A method for controlling a power supply circuit, the power supply unit having a processor and a memory coupled to the processor, the method comprising:
    determining a duty ratio of a control signal of a switching element in a power supply circuit so that an output voltage of the power supply circuit approaches a target voltage;
    computing an acceptable range of a duty ratio based on an output current of the power supply circuit detected by a current detecting circuit; and
    outputting the determined duty ratio when the duty ratio determined by the duty ratio determining is inside the acceptable range, and stopping the power supply circuit when the determined duty ratio is outside the acceptable range;
    multiplying a wiring resistance of the power supply circuit by the output current of the power supply circuit detected by the current detecting circuit;
    adding an output value of the multiplying to the target voltage; and
    dividing an output value of the adding by an input voltage of the power supply circuit.

9. A non-transitory computer-readable recording medium that stores therein a program that causes a computer to execute a process comprising:

determining a duty ratio of a control signal of a switching element in a power supply circuit so that an output voltage of the power supply circuit approaches a target voltage;

computing an acceptable range of a duty ratio based on an output current of the power source circuit detected by a current detecting circuit;

outputting the determined duty ratio when the determined duty ratio is inside the acceptable range, and stopping the power source circuit when the determined duty ratio is outside the acceptable range;

multiplying a wiring resistance of the power supply circuit by the output current of the power supply circuit detected by the current detecting circuit;

adding an output value of the multiplying to the target voltage; and dividing an output value of the adding by an input voltage of the power supply circuit.

\* \* \* \* \*